(12) United States Patent
Christensen et al.

(10) Patent No.: US 12,503,380 B2
(45) Date of Patent: Dec. 23, 2025

(54) ELECTROCHEMICAL WATER DEIONIZATION SEPARATORS

(71) Applicant: Robert Bosch GmbH, Stuttgart (DE)

(72) Inventors: Jake Christensen, Elk Grove, CA (US); Münir M. Besli, San Jose, CA (US); Saravanan Kuppan, San Jose, CA (US); Sondra Hellstrom, East Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 937 days.

(21) Appl. No.: 17/462,553

(22) Filed: Aug. 31, 2021

(65) Prior Publication Data

US 2023/0068559 A1 Mar. 2, 2023

(51) Int. Cl.
*C02F 1/469* (2023.01)
*C02F 1/461* (2023.01)
*C02F 103/08* (2006.01)

(52) U.S. Cl.
CPC ........ *C02F 1/4691* (2013.01); *C02F 1/46104* (2013.01); *C02F 2103/08* (2013.01); *C02F 2201/46115* (2013.01); *C02F 2209/05* (2013.01)

(58) Field of Classification Search
None
See application file for complete search history.

(56) References Cited

U.S. PATENT DOCUMENTS

| 4,135,996 | A | 1/1979 | Bouy et al. |
| 5,180,750 | A | 1/1993 | Sugaya et al. |
| 10,988,391 | B2 | 4/2021 | Kim et al. |
| 2001/0003329 | A1* | 6/2001 | Sugaya ................. B01D 61/48 210/321.71 |
| 2014/0158527 | A1 | 6/2014 | Chung et al. |
| 2019/0022634 | A1* | 1/2019 | Jeong ..................... B01D 69/02 |
| 2020/0123027 | A1 | 4/2020 | Kornbluth et al. |
| 2020/0123028 | A1 | 4/2020 | Kim et al. |
| 2020/0123029 | A1 | 4/2020 | Kornbluth et al. |
| 2020/0131058 | A1 | 4/2020 | Kim et al. |

(Continued)

FOREIGN PATENT DOCUMENTS

| CN | 111938532 A | 11/2020 |
| CN | 212942311 U | 4/2021 |

(Continued)

OTHER PUBLICATIONS

Kim et al., "Na2FeP2O7 as a Novel Material for Hybrid Capacitive Deionization," Electrochimica Acta, 2016, vol. 203, pp. 265-271, http://dx.doi.org/10.1016/j.electacta.2016.04.056.

(Continued)

*Primary Examiner* — Louis J Rufo
(74) *Attorney, Agent, or Firm* — Brooks Kushman P.C.

(57) ABSTRACT

A separator for an electrochemical deionization cell for removing ions from a solution stream. The separator includes an anion exchange membrane layer formed from an anion exchange membrane material. The anion exchange membrane layer has a first surface and an opposing second surface. The separator further includes a porous layer adjacent to the anion exchange membrane layer and formed from a porous material. The porous layer has a first surface and an opposing second surface. The first surface of the porous layer is adjacent to the first surface of the anion exchange membrane layer.

8 Claims, 3 Drawing Sheets

(56) References Cited

U.S. PATENT DOCUMENTS

| | | |
|---|---|---|
| 2020/0148560 A1 | 5/2020 | Hellstrom et al. |
| 2020/0399149 A1 | 12/2020 | Kim et al. |
| 2020/0406248 A1 | 12/2020 | Bahar et al. |
| 2021/0039970 A1 | 2/2021 | Metzger et al. |
| 2021/0198124 A1 | 7/2021 | Metzger et al. |

FOREIGN PATENT DOCUMENTS

| | | |
|---|---|---|
| JP | 2001149762 A | 6/2001 |
| JP | 2001225078 A | 8/2001 |
| JP | 2018-076554 A | 5/2018 |
| KR | 10-2008-0103339 A | 11/2008 |
| WO | 2020032356 A1 | 2/2020 |

OTHER PUBLICATIONS

Lee et al., "Hybrid capacitive deionization to enhance the desalination performance of capacitive techniques," Energy & Environmental Science, 2014, vol. 7, pp. 3683-3689, DOI: 10.1039/c4ee02378a.

Lee et al., "Rocking Chair Desalination Battery Based on Prussian Blue Electrodes," ACS Omega, 2017, vol. 2, pp. 1653-1659, DOI: 10.1021/acsomega.6b00526.

Smith et al., "Na—Ion Desalination (NID) Enabled by Na—Blocking Membranes and Symmetric Na—Intercalation: Porous-Electrode Modeling," Journal of The Electrochemical Society, 2016, vol. 163, No. 3, pp. A530-A539, DOI: 10.1149/2.0761603jes.

International Search Report issued in PCT/US2022/042110, dated Dec. 21, 2022, 4 pages.

Extended European Search Report for European Application No. 23188322, mailed Apr. 30, 2025, 8 pages.

* cited by examiner

ELECTROCHEMICAL WATER DEIONIZATION SEPARATORS

TECHNICAL FIELD

The present disclosure relates to electrochemical water deionization separators.

BACKGROUND

The demand for fresh, potable water is increasing on the Earth. Therefore, obtaining fresh and drinkable water for human consumption, agriculture, and industrial use is quite important. Removing salt and other impurities from seawater and/or industrial water through a desalination process is one of important technologies to secure fresh water, in addition to thermal (e.g., drying process) and mechanical (e.g., reverse osmosis) processes.

SUMMARY

According to one embodiment, a separator for an electrochemical deionization cell for removing ions from a solution stream is disclosed. The separator includes an anion exchange membrane layer formed from an anion exchange membrane material. The anion exchange membrane layer has a first surface and an opposing second surface. The separator further includes a porous layer adjacent to the anion exchange membrane layer and formed from a porous material. The porous layer has a first surface and an opposing second surface. The first surface of the porous layer is adjacent to the first surface of the anion exchange membrane layer.

According to another embodiment, an electrochemical deionization cell for removing ions from a solution stream is disclosed. The cell includes a separator including an anion exchange membrane layer formed from an anion exchange membrane material and a porous layer adjacent to the anion exchange membrane and formed from a porous material. The anion exchange membrane layer has a first surface and an opposing second surface. The porous layer has a first surface and an opposing second surface. The first surface of the porous layer is adjacent to the first surface of the anion exchange membrane layer.

In yet another embodiment, an electrochemical deionization system for removing ions from a solution stream is disclosed. The system includes a cation leakage management computer including non-transitory computer-readable medium comprising instructions for cation leakage management of the electrochemical deionization system that, when executed by a processor, cause the processor to perform the particular operations. The operations include receiving data indicative of an actual salt concentration of an effluent of the solution stream from a cell of the electrochemical deionization system, a cell stack of the electrochemical deionization system, or the entire electrochemical deionization system; determining a theoretical salt concentration of the effluent; and comparing the actual salt concentration of the effluent to the theoretical salt concentration of the effluent to determine a cation leakage condition.

DETAILED DESCRIPTION

Figure 1A:
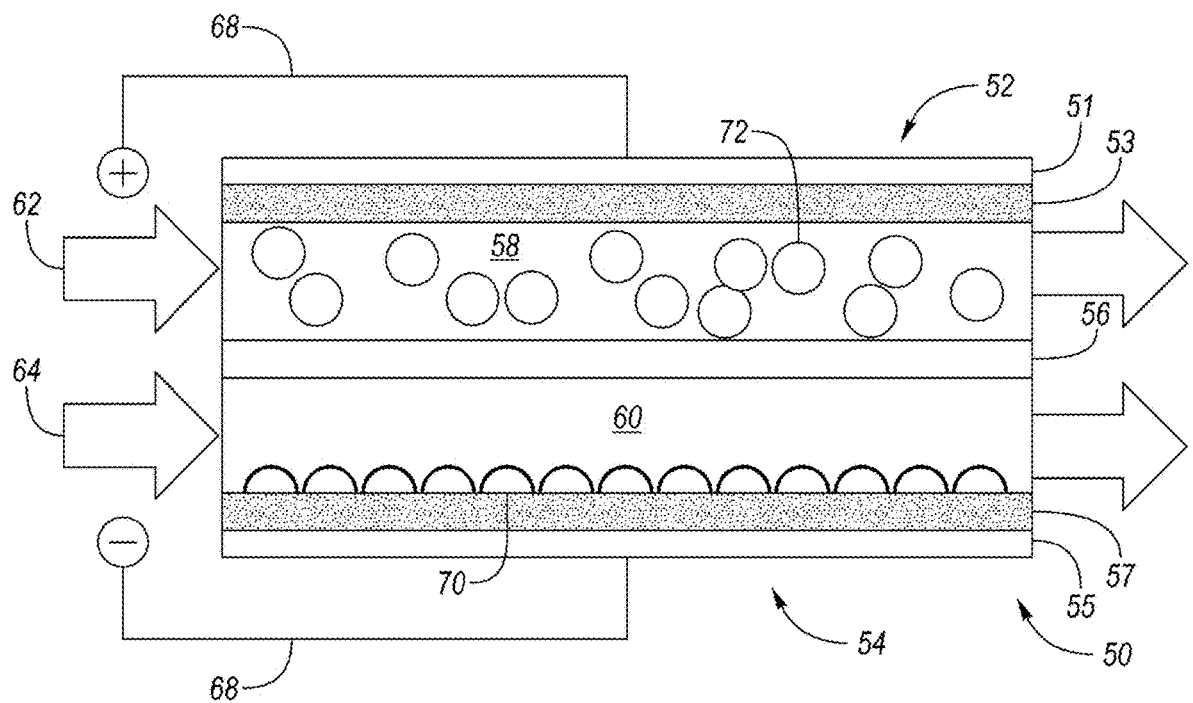
FIGS. 1A and 1B depict a schematic diagram of an intercalative desalination (IDI) cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reverse osmosis and thermal distillation are two examples of systems for removing ions from a solution. While both systems are very effective in desalinating saline solutions having high salinity, such as seawater, these systems are associated with relatively high costs and energy consumption. The concentration of dissolved salts in a saline solution having high salinity may be one of the following values or in the range of any two of the following values: 30,000; 31,000; 32,000; 33,000; 34,000; 35,000; 36,000; 37,000; 38,000; 39,000; and 40,000 parts per million. Desalination of saline solutions having lower salinity, such as brackish water, may be accomplished by using electrochemical desalination systems, such as electrodialysis systems or capacitive deionization systems. These systems may treat a saline solution by partial removal of one or more types of ions from a saline solution stream. The concentration of dissolved salts in a saline solution having lower salinity may be one of the following values or in a range of any two of the following values: 1,500; 2,000; 3,000; 4,000; 5,000; 6,000; 7,000; 8,000; 9,000; 10,000; 11,000; 12,000; 13,000; 14,000; and 15,000 parts per million.

Desalination of a water source can be performed by capacitive deionization (CDI) in an electrochemical cell by applying electrical energy to produce a charge separation of ions. A CDI cell therefore typically contains two electrodes, where anion and cations can be stored at the surface of the electrode material via adsorption and/or double layer formation. CDI cells include carbon-based electrodes configured to adsorb ions. Activated carbon materials may be used as substrates to build up an electrochemical double layer when an electric potential is applied. A saline solution stream flowing between a pair of carbon-based electrodes can be desalinated by reducing the number of ions in the solution stream. Upon reversal of the potential between the pair of electrodes or by shorting the circuit creating the electric potential, adsorbed ions are configured to release into a brine solution having a high concentration of dissolved salts through ion desorption.

Another proposal for an electrochemical desalination cell uses a flow-through desalination battery cell configured to intercalate one or more types of ions into a host structure. This type of electrochemical desalination cell may be referred to as intercalative water desalination (IDI) cell. In an IDI cell, two cation-intercalating electrodes alternatively absorb and release cations from/to two separate water streams or reservoirs. Often the two electrodes are symmetric (e.g., same active material and electrode composition, porosity, thickness, etc.). An ion exchange membrane, typically an anion exchange membrane, is placed between these two electrodes and separates two different saltwater compartments, one of which is purified (e.g., ions removed) and the other concentrated (e.g., ions added).

An IDI cell may have one or more benefits over electro-adsorption-based electrochemical desalination systems, such as capacitive deionization (CDI) cell, which rely on high surface area electrodes. The surface area of the electrode may be any of the following values or in a range of any two of the following values: 400, 450, 500, 550, 600, 650, 700, 750, 800, 850, 900, 950, 1,000, 1,050 and 1,110 $m^2/g$. For instance, electrodes of an IDI system generally have higher available capacities for desalination of lower salinity solutions. These higher available capacities may improve efficiency and/or lower wear on the electrodes. As another example, since IDI cells do not rely on high surface area electrodes to achieve relatively high capacity, IDI cells may be less susceptible to fouling than the electrodes in a typical CDI cell. Also, intercalation compounds may selectively remove specific types of targeted ions from a solution stream, which is advantageous when the solution meets most but not all quality criteria for a given application.

A third alternative of an electrochemical deionization cell is a hybrid capacitive deionization (HCDI) cell. HCDI uses a cation intercalation host electrode and incorporates an anion exchange membrane for water desalination and cleaning process. The HCDI cell has one cation intercalation host electrode coupled with a carbon-based electrode (e.g., porous carbon, activated carbon, etc.) on the other side.

Figure 1B:
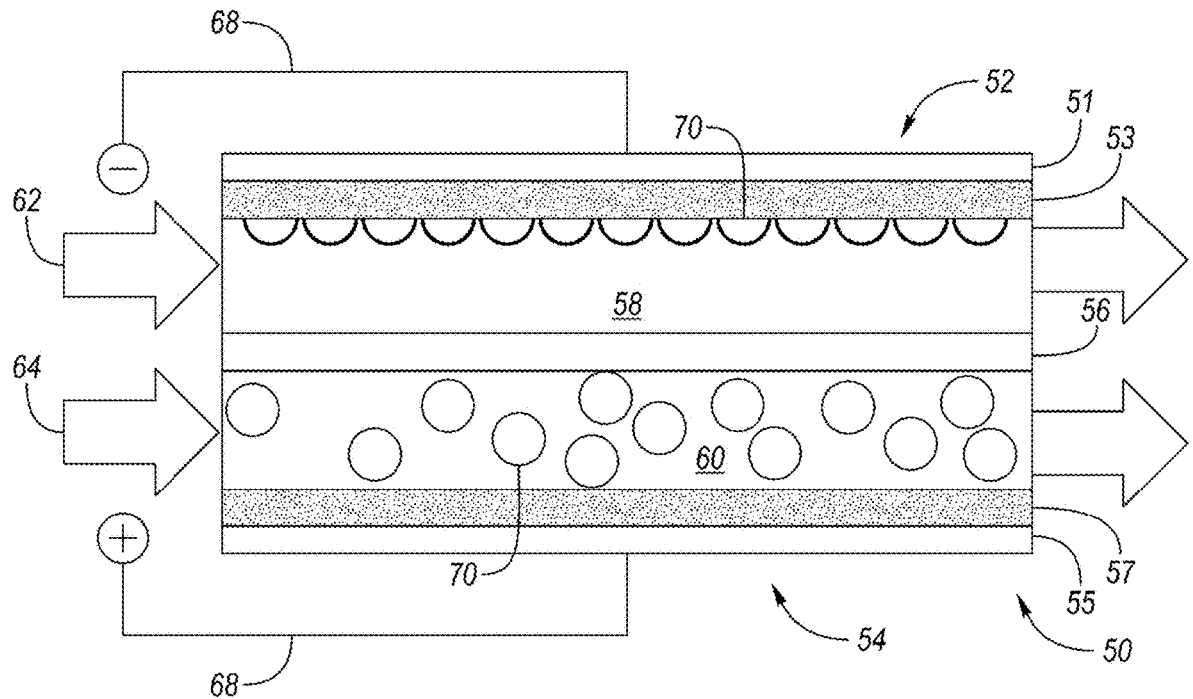

An DI cell may be configured to simultaneously process of first and second saline solutions streams, such as first and second brackish water streams, to produce a diluted solution stream and a concentrated solution stream. FIGS. 1A and 1B depict a schematic diagram of IDI cell 50. An IDI cell includes first and second intercalation electrodes. First and second intercalation electrodes 52 and 54 are separated by anion exchange membrane 56. As a potential is applied to the first and second intercalation electrodes, cations from the substantially filled side are desorbed to create a brine solution stream, while cations in the adjacent compartment including the substantially empty electrode are removed from the feed solution by intercalating into the substantially empty electrode.

First intercalation electrode 52 includes first substrate 51 and first intercalation host 53 is applied to first substrate 51. Second intercalation electrode 54 includes second substrate 55 and second intercalation host 57 applied to second substrate 55. In one or more embodiments, an ion-selective membrane or an anion exchange member is placed between the surface of first and/or second intercalation electrodes 52 and 54 and the saline solution. This configuration permits released cations to recombine with anions from the opposite cell compartment. A water-permeable separator (not shown) may be used to prevent electrical contact between the first and second intercalation electrodes 52 and 54.

First compartment 58 is formed between first intercalation electrode 52 and anion exchange membrane 56. Second compartment 60 is formed between second intercalation electrode 54 and anion exchange membrane 56. As depicted by arrow 62, a first saline solution is fed into first compartment 58. As depicted by arrow 64, a second saline solution is fed into second compartment 60. The first and/or second saline solutions may be brackish water.

First and second intercalation electrodes 52 and 54 each have a state of charge (SOC) that changes continuously during operation. For example, first intercalation electrode 52 may start at 100% SOC and second intercalation electrode 54 at 0% SOC. As IDI cell 50 is operated, the SOC of first intercalation electrode 52 drops from 100% to 0% while the SOC of second intercalation electrode 54 rises from 0% to 100%. At the end of this "half cycle," the current (or voltage) is flipped and the cell runs in reverse, while being coordinated with the switching of valves, at least at the final outlets of IDI cell 50, such that the waste (brine) and purified streams continue to be provided as needed in DI cell 50.

FIG. 1A depicts a first half-cycle operation of IDI cell 50 and FIG. 1B depicts a second half-cycle operation of IDI cell 50. At the beginning of the first half-cycle operation, first intercalation electrode 52 is substantially empty and second intercalation electrode 54 is substantially full. During the first half-cycle operation, a power source through circuit 68 applies a current to generate an electric potential between first intercalation electrode 52 and second intercalation electrode 54 such that first intercalation electrode 52 has a positive charge and second intercalation electrode 54 has a negative charge. FIG. 1A shows a state in which cations 70 were released from first intercalation electrode 52 into first compartment 58, while cations 70 in second compartment 60 were intercalated into second intercalation electrode 54. During each half-cycle operation, anions 72 cross anion exchange membrane 56 to recombine with cations 70 released from one of first and second intercalation electrodes 52 and 54. IDI cell 50 is configured to supply a continuous stream of freshwater. When a saline solution (e.g., brackish water) is flowed through DI cell 50 and a current is applied by a power source through circuit 68, calcium and/or magnesium cations are intercalated into first or second intercalation hosts 53 or 57, and anions (e.g., chlorine and carbonate anions) are accumulated in the opposite first or second compartment 58 or 60 by transporting through anion exchange membrane 56. The outlet solution from one of first or second compartment 58 or 60 is softened (e.g., contains a lower concentration of calcium and/or magnesium cations) while the other of first and second compartment 58 and 60 is enriched in salinity and is considered a wastewater stream.

Figure 2:
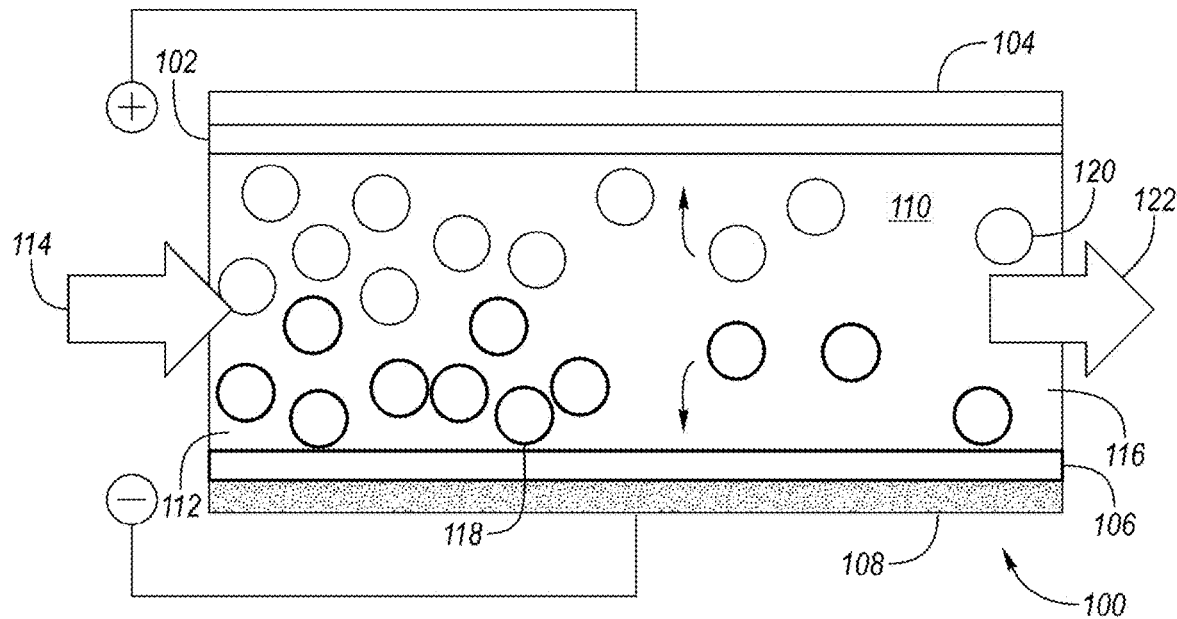
FIG. 2 depicts a schematic diagram of an example of a hybrid capacitive deionization (HCDI) cell.

FIG. 2 depicts a schematic diagram of hybrid capacitive deionization (HCDI) system 100. HCDI cell 100 includes anion exchange membrane 102 in a layer-to-layer configuration with carbon-based electrode 104. Anion exchange membrane 102 may contact carbon-based electrode 104. HCDI cell 100 includes cation exchange membrane 106 in a layer-to-layer configuration with intercalation host 108. Cation exchange membrane 106 may contact intercalation host 108. Compartment 110 is formed between spaced apart anion exchange membrane 102 and cation exchange membrane 106. HCDI cell 100 may be configured to desalinate and soften a saline solution based on a combination of ion intercalation and electro-adsorption.

Compartment 110 includes inlet 112 configured to inlet a saline solution, as depicted by arrow 114. The saline solution may be brackish water or seawater. Force is applied to the saline solution so that it flows from inlet 112 to outlet 116 through compartment 110, as depicted by arrow 122. Cations 118 within the feed saline solution stream are removed through intercalation, while anions 120 are adsorbed on carbon-based electrode 104. Anion exchange membrane 102 is configured to increase efficiency by decreasing co-ion adsorption (e.g., co-ion adsorption on carbon-based electrode 104). The saline solution is only desalinated during one half-cycle due to the non-symmetric nature of HCDI cell 100.

An anion exchange membrane (e.g., anion exchange membrane 56 of IDI cell 50 or anion exchange membrane 102 of HCDI cell 100) is configured to allow transport of anions (e.g., chlorine anions and/or carbonate anions) through the anion exchange membrane while preventing transport of cations (e.g., calcium cations, magnesium cations, and/or sodium cations) and water. For example, anion exchange membrane 56 is configured to allow transport of anions from the water stream of one of first or second compartment 58 or 60 to the other water stream while preventing transport of cations and water. Applying an electric field results in simultaneous (a) emptying of the intercalation host of cations from one of first and second intercalation electrodes 52 and 54 into a concentration (e.g., waste) stream, (b) insertion of cations into the intercalation host of the other of first and second intercalation electrodes 52 and 54 from a purified stream, and (c) transfer of anions from the purified stream to the waste stream. Electroneutrality (e.g., stoichiometric pairing of cation and anion charges) is maintained throughout the IDI cell 54 on a macroscopic scale.

The anion exchange membrane of one or more embodiments may be used in a stack or series of electrochemical cells (e.g., a HCDI or IDI deionization system). Each cell may comprise an anode, a cathode and an ion exchange membrane (e.g., an anion exchange membrane of one or more embodiments). Each cell includes inlet and outlet channels with control valves that control the separation of the source water into a brine stream (e.g., referred to as a concentrated stream or a waste stream) and a clean water stream (e.g., referred to as a purified stream). The deionization system may include multiple electrochemical cells connected electrically in series, parallel or a combination of both. The cells may also be in serial, parallel, or combined fluid communication.

A desirable feature of an anion exchange membrane or more generally, a separator, is zero permeability of the one or more cations and water and very high permeability (i.e., low ionic resistance) of one or more anions. The ionic resistance may be in any of the following ranges: less than 100 ohm-cm$^2$, less than 25 ohm-cm$^2$, less than 10 ohm-cm$^2$, and less than 5 ohm-cm$^2$. The ionic resistance of the electromechanical cell is reduced as the anion exchange membrane is made thinner and thinner. For instance, the ionic resistance may be about 20 ohm-cm$^2$ at a thickness of 130 µm. By reducing the thickness of the membrane in half, the ionic resistance is reduced by half. However, if the anion exchange membrane is too thin, it may not have enough mechanical strength to withstand the mechanical processes involved in cell and stack manufacturing, which may involve roll-to-roll processes, stacking, winding, or other processes, depending upon the cell or cell stack design.

To improve the mechanical robustness of the anion exchange membrane and composite electromechanical cells while minimizing cell resistance and/or energy inefficiencies, one or more embodiments disclose a separator having one or more advantages over conventional anion exchange membranes.

Figure 3:
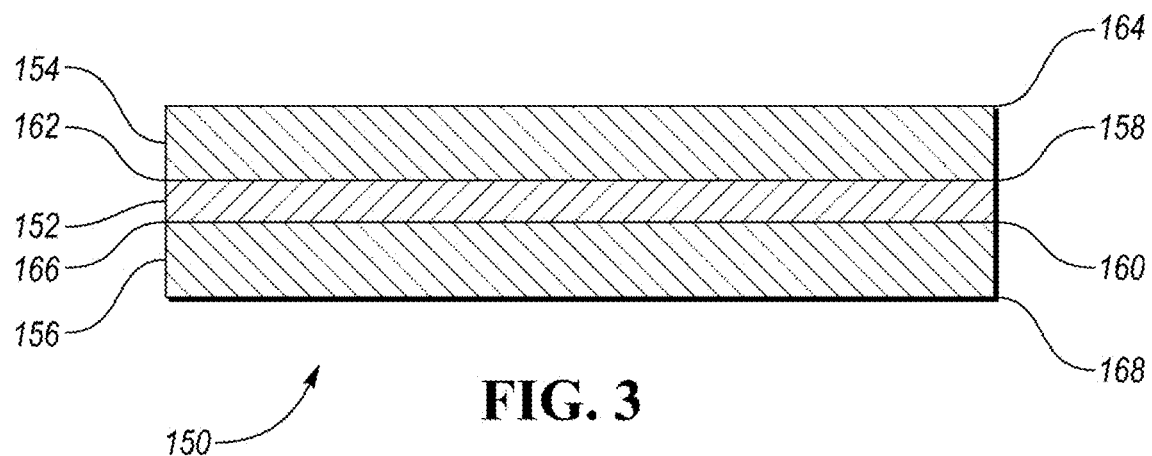
FIG. 3 depicts a cross section view of a portion of a separator according to a first embodiment and including anion exchange membrane inner layer sandwiched between first and second porous outer layers.

FIG. 3 depicts separator 150 including anion exchange membrane inner layer 152 sandwiched between first and second porous outer layers 154 and 156. In one embodiment, separator 150 includes anion exchange membrane inner layer 152 and only one of first and second porous outer layers 154 and 156. Anion exchange membrane inner layer 152 includes first and second surfaces 158 and 160. First porous outer layer 154 includes first and second surfaces 162 and 164. Second porous outer layer 156 includes first and second surfaces 166 and 168. As shown in FIG. 3, first surface 158 of anion exchange membrane inner layer 152 contacts first surface 162 of first porous outer layer 154. As shown in FIG. 3, second surface 160 of anion exchange membrane inner layer 152 contacts first surface 166 of second porous outer layer 154.

The thickness of anion exchange membrane inner layer 152 may be any of the following values or in a range of any two of the following values: 1, 2, 3, 4, 5, 10, 15, 20, 25, 30, 35, 40, 45, 50, 55, 60, 65, 70, 75, 80, 85, 90, 95, 100, 110, 120, 130, 140, 150 and 200 µm. The porosity of anion exchange membrane inner layer 152 may be less than or equal to 0.1%. Anion exchange membrane inner layer 152 is configured to provide facile transport of anions such as chloride and/or carbonate while providing a barrier to cations and water.

Anion exchange membrane inner layer may be formed of an anion exchange membrane material. Non-limiting examples of anion exchange membrane materials include Fumasep FAB-PK-130 anion exchange membrane available from Fuma-Tech BWT GmbH of Bietigheim-Bissingen, Germany; Astom ASE, AHA, ACS, AFX, and ACM anion exchange membranes available from Astom Corp. of Tokyo, Japan; Selemion AMV anion exchange membrane available from Asahi Glass Co., Ltd. of Tokyo, Japan; Nafion anion exchange membranes available from The Chemours Company of Wilmington, Del.; Pention-AEM-18-X-15% Cross-linking Anion Exchange Membrane (X=5-30) available from the Fuel Cell Store of College Station, Texas; Xion AEM-Dappion-X Composite Anion Exchange Membrane (X=5-30) available from the Fuel Cell Store of College Station, Texas; and Xion AEM-Durion-G2-X Composite Anion Exchange Membrane (X=5-20) also available from the Fuel Cell Store of College Station, Texas.

In one embodiment, anion exchange membrane inner layer 152 and first and/or second porous outer layers 154 and/or 156 are formed of the same anion exchange membrane material. In such an embodiment, increased surface area for transport of anions between an aqueous electrolyte and an anion exchange membrane conductor is provided, thereby reducing kinetic resistance.

A separator having an anion exchange membrane inner layer and first and/or second porous outer layers may be formed using a pore former process. As a first step, an anion exchange membrane material having a thickness of the total thickness of the anion exchange membrane inner layer and the one or two porous outer layer is used. As a second step, a pore former material is introduced into one or both surfaces of the anion exchange material to a thickness associated with the thickness of the one or two porous outer layers. Non-limiting examples of pore former materials include alkali salts, sublimation materials (e.g., camphor), and combinations thereof. The pore former material may be mixed with a liquid where the liquid mixture is applied to the one or both surfaces of the anion exchange membrane material. Once the liquid mixture is applied to one or both surfaces of the anion exchange membrane material, the pore former material may be removed by dissolving the material into a solvent. Non-limiting examples of solvents include NaCl, EtOH, isopropyl alcohol, n-methylpyrrolidone, and mixtures thereof. In another embodiment, the pore former material may be removed by a mild heat treatment of a mild heat treatment material at a mild heat treatment temperature. The mild heat treatment material may be a camphor (terpenoid) polymer. The mild heat treatment temperature may be any of the following temperatures or in a range of any two of the following temperatures: 60, 65, 70, 75, 80, 85, 90, 95, and 100° C.

In other embodiments, anion exchange membrane inner layer 152 is formed of a first material and first and/or second porous outer layers 154 and/or 156 are formed of a second material, which is different than the first material. The first material may be an anion exchange membrane material. The second material may be a porous material. Non-limiting examples of the porous material may be one or more polyolefins, glass fiber, porous alumina, porous silica, carbon fiber mesh, perfluoroalkoxy alkane (PFA) polymer, polytetrafluoroethylene (PTFE), other porous polymers, and combinations thereof. The porous material may be relatively less expensive than the anion exchange membrane material, while maintaining chemical stability and mechanical robustness. The porous material may be configured to have better anion transfer properties (e.g., conductivity and/or diffusivity) than the anion exchange membrane material, but the porous material may not be a strong barrier to cations or water where this functionality is provided by the anion exchange membrane material of the inner layer. The two or more layers may be stacked or rolled together prior to or during the cell assembly process. In one embodiment, the adjacent layers of the two or more layers are not bonded to each other. Each porous material and/or the anion exchange membrane material layer may be comprised of two or more sublayers to enhance mechanical robustness and/or to reduce cation leakage.

The thickness of first and/or second porous outer layers 154 and/or 156 may be any of the following values or in a range of any two of the following values: 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, and 100 μm. The porosity of first and/or second porous outer layers 154 and/or 156 may be any of the following values or in a range of any two of the following values: 10, 15, 20, 25, 30, 35, 40, 45, 50, 55, 60, 65, 70, 75, 80, 85, and 90%. A polyolefin porous material may have a porosity in the range of 15 to 40%. A glass fiber separator may be thicker than other porous materials but may have a porosity of about 90% in an uncompressed state.

Figure 4:
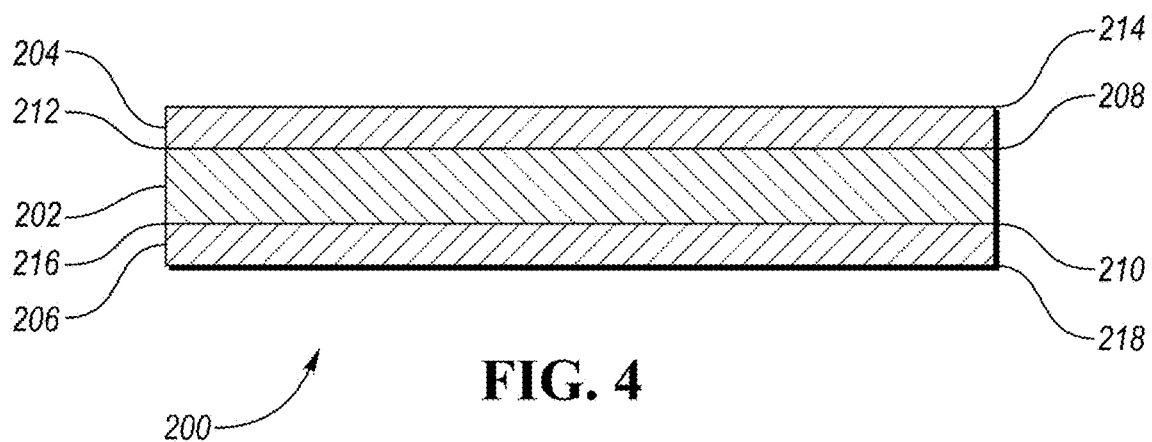
FIG. 4 depicts a cross section view of a portion of a separator according to a second embodiment and including a porous inner layer sandwiched between first and second anion exchange membrane outer layers.

FIG. 4 depicts separator 200 including porous inner layer 202 sandwiched between first and second anion exchange membrane outer layers 204 and 206. Porous inner layer 202 includes first and second surfaces 208 and 210. First anion exchange membrane outer layer 204 includes first and second surfaces 212 and 214. Second anion exchange membrane outer layer 206 includes first and second surfaces 216 and 218. As shown in FIG. 4, first surface 208 of porous inner layer 202 contacts first surface 212 of first anion exchange membrane outer layer 204. As shown in FIG. 4, second surface 210 of porous inner layer 202 contacts first surface 216 of second anion exchange membrane outer layer 204. Porous inner layer 202 is substantially filled with an ionic liquid with one or more large cations (e.g., ammonium, (methyl)imidazolium, and (methyl) pyrrolidinium, and variations thereof) and the one or more anions to be transported and/or other anions. In one embodiment, and as shown in FIG. 4, porous inner layer 202 is thicker than first and second anion exchange membrane outer layers 204 and 206 to enhance mechanical stability. First and second anion exchange membrane outer layers 204 and 206 may be thinner than porous inner layer 202 to provide fast transport of one or more anions and/or to prevent leakage of one or more cations in the water streams and/or the ionic liquid. The use of first and second anion exchange membranes outer layers 204 and 206 is configured to enhance an overall barrier to cation and water transport.

One or more systems for managing (e.g., detecting and mitigating) cation leakage through an anion exchange membrane is provided. A potential indicator of cation leakage may be a greater than actual salt concentration than a theoretical salt concentration in a purified stream effluent from a cell in a deionization system, a cell stack in a deionization system, or the entire deionization system. The theoretical salt concentration may be determined from an inlet salt concentration; a flow rate through a cell, a cell stack, or the entire deionization system; and/or an applied current to a cell, a cell stack, or the entire deionization system. Another potential indicator may be a less than actual salt concentration than a theoretical salt concentration in a waste stream effluent from a cell in a deionization system, a cell stack in a deionization system, or the entire deionization system. The theoretical salt concentration may be determined from an inlet salt concentration; a flow rate through a cell, a cell stack, or the entire deionization system; and/or an applied current to a cell, a cell stack, or the entire deionization system.

In one or more embodiments, the system includes one or more sensors at the effluent of one or both streams (i.e., a purified stream and a waste stream) configured to sense data (e.g., water temperature sensor and a conductivity sensor) indicative of one or more actual salt concentrations (e.g., as a function of water temperature and conductivity). The salt concentration sensor data may be provided as an input to the cation leakage management system. The cation leakage system may be configured to determine one or more theoretical salt concentrations of the effluent and to compare the one or more theoretical concentrations against sensor data indicative of one or more salt concentrations. If an actual salt concentration is less than the theoretical salt concentration in the waste stream and/or is greater than the theoretical salt concentration in the concentration stream, then a cation leakage condition is met. The system may be configured to transmit an alert a user (e.g., via a display on an appliance or a water softening device associated with a deionization system, or via a cloud-connected app on a mobile device) that the deionization system (e.g., a water softening device or an individual cell stack or cell) should be repaired or replaced when the cation leakage condition is met. In another embodiment, a detection of cation crossover may be performed offline using a suite of sensors and estimators applied during servicing of the equipment.

In another embodiment, a self-repair operation may be performed in which the cell, cell, or device is purged with a fluid configured to remove impurities that may negatively impact cation crossover. For example, unintended hard water deposits on the membrane may impart a mechanical stress that enhances the permeability to cations and/or water, and these deposits may be removed using a solution of malic or acetic acid.

A self-repair approach according to another embodiment is to heat the incoming water to bring the anion exchange membrane polymer material to a self-healing temperature (e.g., above the polymer's glass transition temperature) to repair any pinholes or other defects that have formed in the membrane. A processor of the cation leakage management system may be configured to transmit instructions to a deionization system (e.g., a thermal device thereof) to heat the incoming water.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications. Applications for the deionization systems of one or more embodiments include water desalination (e.g., converting brackish or saltwater to purified water for drinking, agriculture, industrial applications, power generation, electrolysis, etc.) and water softening (e.g., targeted removal of hard ions such as calcium and magnesium) to improve durability of pipes and appliances that use water (e.g., dishwashers or steam ovens).

What is claimed is:

1. A separator for an electrochemical deionization cell for removing ions from a solution stream, the separator comprising:
    an anion exchange membrane layer formed from an anion exchange membrane material, the anion exchange membrane layer having a first surface and an opposing second surface; and
    a porous layer adjacent to the anion exchange membrane layer and formed from a porous material, the porous layer having a first surface and an opposing second surface, the first surface of the porous layer being adjacent to the first surface of the anion exchange membrane layer, the porous layer being at least partially filled with an ionic liquid, and the ionic liquid includes one or more cations including ammonium, (methyl)imidazolium, (methyl)pyrrolidinium, or a combination thereof.

2. The separator of claim 1, wherein the anion exchange membrane material is different than the porous material.

3. The separator of claim 1, further comprising a second porous layer adjacent to the anion exchange membrane layer and formed from a second porous material, the second porous layer having a first surface and an opposing second surface, and the first surface of the second porous layer being adjacent to the second surface of the anion exchange membrane layer.

4. The separator of claim 1, further comprising a second anion exchange membrane layer formed from a second anion exchange membrane material, the second anion exchange membrane layer having a first surface and an opposing second surface, and the second surface of the second anion exchange membrane layer being adjacent to the second surface of the porous layer.

5. The separator of claim 1, wherein the anion exchange membrane layer has an anion exchange membrane layer thickness, the porous layer has a porous layer thickness, and the anion exchange membrane layer thickness is less than the porous layer thickness.

6. The separator of claim 1, wherein the one or more cations includes ammonium.

7. The separator of claim 1, wherein the one or more cations includes (methyl)imidazolium.

8. The separator of claim 1, wherein the one or more cations includes (methyl)pyrrolidinium.

* * * * *